(12) United States Patent
Walter et al.

(10) Patent No.: US 6,246,995 B1
(45) Date of Patent: Jun. 12, 2001

(54) PRODUCT ACTIVITY DATA COLLECTION SYSTEM

(75) Inventors: Joanne S. Walter, Alpharetta; John L. Morrow, Snellville, both of GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/087,817

(22) Filed: May 29, 1998

(51) Int. Cl.⁷ .................................................. G06F 17/60
(52) U.S. Cl. ............................... 705/22; 705/22; 705/20; 340/825.35; 340/825.49; 340/825.52
(58) Field of Search .................... 705/22, 20, 5, 705/6; 235/376, 383, 432, 375

(56) References Cited

U.S. PATENT DOCUMENTS

| | | | |
|---|---|---|---|
| 4,649,481 | 3/1987 | Takahashi | 364/405 |
| 4,751,641 | 6/1988 | Collins, Jr. et al. | 364/405 |
| 4,780,599 | 10/1988 | Baus | 235/383 |
| 4,843,546 | 6/1989 | Yoshida et al. | 364/403 |
| 4,870,577 | 9/1989 | Karasawa et al. | 364/405 |
| 5,172,314 | 12/1992 | Poland et al. | 364/401 |
| 5,216,233 | 6/1993 | Main et al. | 235/472 |
| 5,250,789 | 10/1993 | Johnsen | 235/383 |
| 5,294,781 | 3/1994 | Takahashi et al. | 235/376 |
| 5,331,544 * | 7/1994 | Lu et al. | 364/401 |
| 5,347,115 | 9/1994 | Sherman et al. | 235/472 |
| 5,424,524 | 6/1995 | Ruppert et al. | 235/462 |
| 5,457,307 | 10/1995 | Dumont | 235/383 |
| 5,493,107 | 2/1996 | Gupta et al. | 235/383 |
| 5,629,511 | 5/1997 | Iwaguchi et al. | 235/462 |
| 5,642,279 | 6/1997 | Bloomberg et al. | 395/214 |
| 5,710,416 | 1/1998 | Belknap et al. | 235/383 |
| 5,839,116 * | 11/1998 | Goodwin III | 705/20 |
| 5,870,714 * | 2/1999 | Shetty et al. | 705/20 |
| 5,923,735 * | 6/1999 | Swartz et al. | 379/93.12 |
| 5,978,772 * | 11/1999 | Mold | 705/16 |

FOREIGN PATENT DOCUMENTS

0749091 A2 * 12/1996 (EP) .............................. G06K/17/00

OTHER PUBLICATIONS

The electronic edge: in a marketplace characterized by slim margins and a shrinking labor pool, electronic equipment can offer retailers a substantial competitive edge, Progressive Grocer v69, n11, p71, Grudzinzki, Gregory L. Oct. 1990.*

FM hand–held units speed price changes; labor costs saved. (date–entry units), Supermarket News, v37, p44(2), Cobb, Holly A. Jan. 1987.*

ConsumerScan ; http://www.bassinc.com/consumer-scan.html.*

* cited by examiner

Primary Examiner—James P. Trammell
Assistant Examiner—Yehdega Retta
(74) Attorney, Agent, or Firm—Francis L. Conte

(57) ABSTRACT

A system and method are provided for collecting activity data for a plurality of products displayed in a merchandising store. A transaction terminal identifies a product presented for purchase and prints an itemized receipt therefor. A remote price verifier permits price verification of the product independently of the terminal. Purchase data from the terminal is stored. Verification data from the verifier is stored. Comparison of the purchase and verification data for a specific product may be used for improving its sales performance.

14 Claims, 3 Drawing Sheets

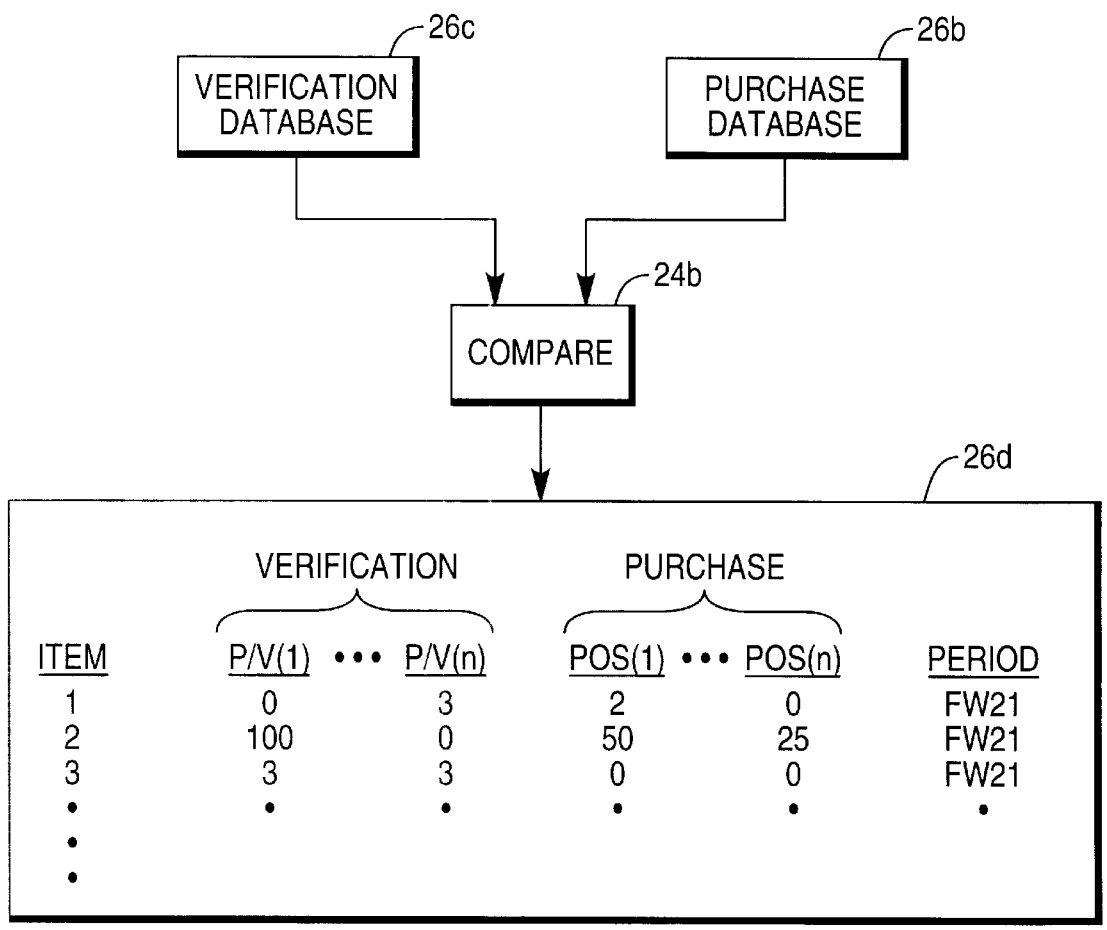

PRODUCT ACTIVITY DATA COLLECTION SYSTEM

BACKGROUND OF THE INVENTION

The present invention relates generally to point of sales (POS) terminals, and, more specifically, to product management in a merchandising store.

In a typical retail store, various products are displayed for examination by customers and eventual purchase. The product typically includes a barcode in the exemplary form of the one-dimensional universal product code (UPC). The barcode represents a unique number typically known as a product look-up unit (PLU) number for identifying the specific product and its sale price.

When the product is brought to a POS terminal for purchase, a barcode scanner reads the barcode for determining its price. The terminal typically transmits the PLU number to a central server or computer which accesses a price look-up database to obtain the price therefor which is then returned to the terminal for display on a monitor. In this way individual products are scanned and priced, and listed on a receipt which is printed at the terminal for delivery to the customer upon completion of the purchase transaction.

In a recent development, price verifiers are now being introduced in stores to complement the POS terminals. Like the POS terminal, a price verifier includes a barcode scanner for reading the product barcode to determine its identification number, and is also joined to the common server to access the price database and determine the price for the product. The look-up price is returned to the price verifier and is displayed on a small monitor thereon so that a customer may confirm or verify the price of the product prior to purchase at the POS terminal. Unlike the POS terminal, the price verifier is not configured for completing a purchase since it lacks a cash register, receipt printer, and associated hardware and software found in the more complex terminal.

Whereas the POS terminals are typically centralized in a row thereof near the store entrance, one or more of the price verifiers are distributed throughout the store for being readily available to customers for verifying product prices from the barcodes. Since the POS terminal determines product price from the price database, this price may not match the price label displayed on the product itself or on the display shelf. Accordingly, price verifiers presently found in retail service are experiencing heavy use for price confirmation. Price verifier usage is presently determined by a simple sequential counter which records the number of price look-ups made at the verifier over a period of time.

Product manufacturers and retailers manage the various categories of products displayed in a retail store based primarily only on which and how many products are actually sold. This data is obtained from inventory records as products are sold. Of course some products sell better than others, and some products have the capability of being sold in larger quantities which is affected by various marketing factors including advertising, store displays, quantity and location of the products in the stores as a few examples.

It is an object of the present invention to improve management of product inventory for promoting sales performance.

SUMMARY OF THE INVENTION

A system and method are provided for collecting activity data for a plurality of products displayed in a merchandising store. A transaction terminal identifies a product presented for purchase and prints an itemized receipt therefor. A remote price verifier permits price verification of the product independently of the terminal. Purchase data from the terminal is stored. Verification data from the verifier is stored. Comparison of the purchase and verification data for a specific product may be used for improving its sales performance.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 3 is a flowchart representation comparing the purchase and verification databases illustrated in FIG. 2 for improving sales performance in accordance with an exemplary embodiment.

DESCRIPTION OF THE PREFERRED EMBODIMENT(S)

Figure 1:
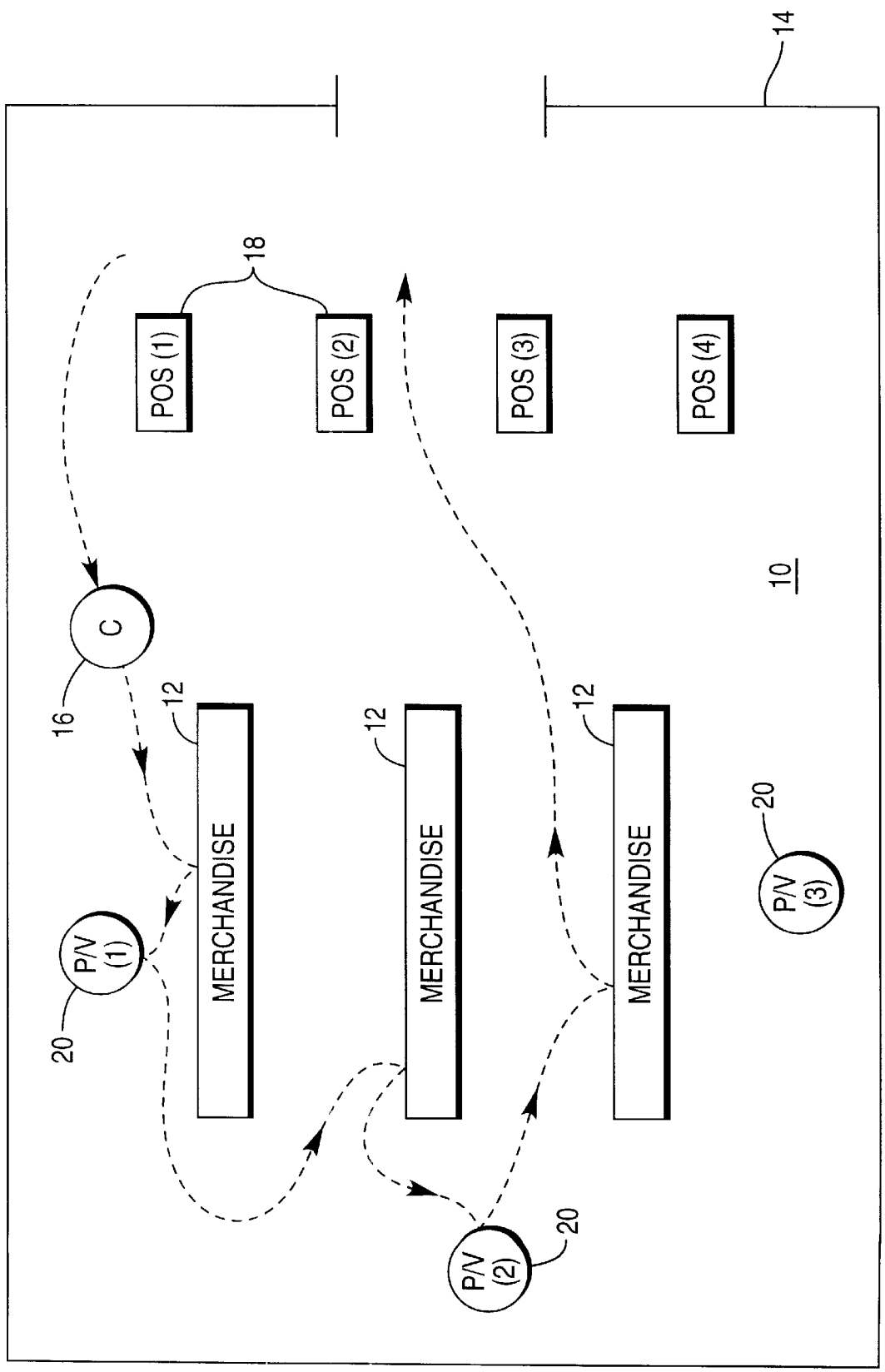
FIG. 1 is a schematic floor plan of an exemplary merchandising store including aisles of displayed merchandise, POS terminals, and price verifiers.

Illustrated schematically in FIG. 1 is a system or network 10 for collecting and processing activity data for a plurality of different products or merchandise 12 suitably displayed on shelves in a merchandising retail store 14. The store may have any conventional form to offer for sale products for purchase by a customer (C) 16.

Means in the form of a plurality of point-of-sale (POS) transaction terminals 18 are provided at a convenient location such as the front of the store so that products brought thereto by the customer may be identified and purchased. Four of the terminals are shown in the example illustrated in FIG. 1.

Additional means in the form of a plurality of price verifiers (P/Vs) 20 are suitably distributed throughout the store and are located remotely from the terminals 18 for allowing the customer to verify prices of the products prior to purchase at one of the terminals 18. Three price verifiers are shown in the example illustrated in FIG. 1.

In a typical shopping trip to the store 14, the customer 16 may travel from aisle to aisle examining one or more different products and collecting those desired for subsequent purchase at the terminal 18. The customer may desire to check the price of a specific product and may therefore use a conveniently located one of the price verifiers 20 by simply presenting the product thereto for scanning. Upon completion of the trip through the store, the customer presents one or more of the products at one of the terminals 18 for purchase.

Figure 2:
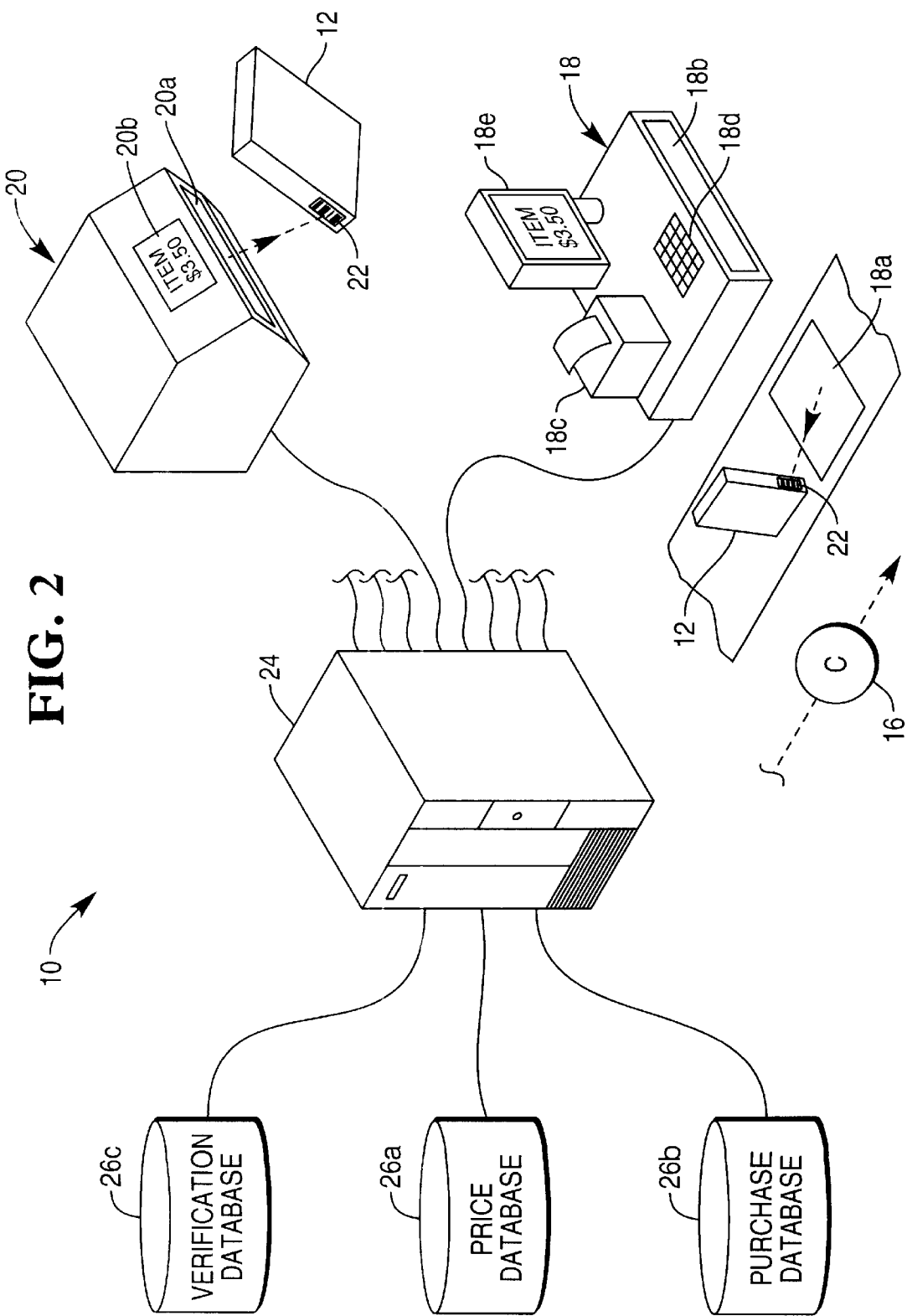
FIG. 2 is a schematic representation of the POS terminals and price verifiers illustrated in FIG. 1 operatively joined to a common server and attached databases for price, purchase, and verification in accordance with an exemplary embodiment of the present invention.

An exemplary embodiment of the system 10 is illustrated schematically in more particularity in FIG. 2. Each POS terminal 18 may have any conventional configuration and typically includes a laser barcode scanner 18a, a cash register 18b, a receipt printer 18c, a keyboard 18d, and a display monitor 18e, for example. These components are operatively joined to an internal controller of the terminal 18 which is typically in the form of a programmable central processing unit (CPU) or digital computer for conventionally controlling the various operations of the terminal 18.

Each product or item 12 includes a barcode 22 identifying the product in any conventional manner. For example, the barcode 22 may be in the exemplary form of a one-dimensional universal product code (UPC) barcode having a series of alternating dark bars and light spaces of varying width representing a unique product look-up unit (PLU) number.

Accordingly, one or more different products 12 may be presented by the customer 16 at the terminal 18 for purchase. The barcode scanner 18a emits a laser beam which traverses the barcode 22 and decodes it into the corresponding PLU number.

The several terminals 18 are suitably connected to a common server 24 which is typically a digital computer programmed with suitable software. The server is conventional, and provides control means for centralizing operation of the various terminals 18 joined thereto.

Means in the form of a price look-up or first database 26a are operatively joined to the server 24 in suitable communication therewith for storing corresponding prices for all the products available for purchase in the store. The price database 26a is found in a suitable memory device associated with the server 24 for pre-storing the sales price for each of the corresponding products maintained in inventory.

In this way, when an individual product 12 is scanned at one of the terminals 18, its identification number is suitably transmitted to the server 24 which in turn uses this number to access the corresponding price for the item in the price database 26a. The product price is then retrieved by the server for display at the terminal 18. The terminal 18 then records the product and price in a list to which are added additional products 12 as presented by the customer. The total amount of sale for the list of products presented by a customer is calculated. The printer 18c prints a corresponding receipt therefor, and payment is made by the customer for completing the sale.

Means in the form of a purchase or second database 26b are operatively joined to the server 24 in suitable communication therewith and permit storing the entire transaction or purchase record data for each transaction at each of the terminals 18. For example, each of the several terminals 18 may have a unique identifying or serial number which is transmitted to the server 24 along with the transaction data for being stored in the purchase database.

The server 24 is programmed with suitable software to store completed transactions for each of the terminals 18 in the purchase database 26b. For example, the purchase data stored in the database 26b may include the identification or location of the individual terminal 18, the date and time for an individual purchase transaction as obtained from an internal clock in the server 24, and an identification of each product purchased at the terminal. The purchase data stored in the database 26b may then be used for various purposes including inventory management for determining when to replenish products in the store as they are depleted during purchasing.

Each of the price verifiers, as illustrated in FIG. 2 for example, may include a suitable laser barcode scanner 20a and display monitor 20b operatively joined together through an internal CPU for scanning a product 12 and determining a price therefor, which is displayed on the monitor 20b. Like the terminals 18, each of the price verifiers 20 is operatively joined in communication with the common server 24 for similarly accessing the price database 26a.

In operation, the scanner 20a decodes the barcode 22 on the product 12 presented thereto and transmits the identifying PLU number to the server 24 which in turn accesses the price database 26a for retrieving the stored price therefor. The server 24 returns the look-up price to the requesting price verifier 20 and displays the product and price in the monitor 20b thereof. In this way, a customer may visually confirm, before purchase, the price associated with a specific product 12 presented to the verifier 20 for confirmation.

The system 10 as disclosed in part above may have any conventional configuration and operation. Exemplary POS terminals 18, price verifiers 20, common server 24, and associated price and purchase databases 26a,b are presently found in commercial and public use. However, since the price verifier 20 presently found in use has the limited function of verifying price only, it has not been used to its full potential.

In accordance with the present invention, the system 10 is modified for collecting additional activity data associated with the products 12 being offered for sale in the store 14. In a preferred embodiment, the system 10 as illustrated in FIG. 2 additionally includes means in the form of a verification or third database 26c operatively joined in communication with the common server 24 for storing predetermined verification data for products presented to the several price verifiers 20.

Since the price verifiers 20 are available to customers for use they also provide a convenient source for additional data not previously available. By interacting with the price verifier 20, the customer shows an initial interest in a selected product 12 since the price therefor is of interest to the customer. The server 24 is therefore modified in accordance with the present invention to include additional software for storing the desired verification data or record in the additional verification database 26c. The verification data may include, for example, an identification of the specific product 12 presented and verified at any one of the verifiers 20.

Accordingly, a new method for collecting activity data for the plurality of products 12 displayed in the store 14 may be used to advantage. In a basic embodiment, the method includes using the server 24 for storing in the purchase database 26b certain purchase data including identification of a product actually purchased at one of the terminals 18 as is conventionally effected. Similarly, the server 24 is additionally programmed for storing in the verification database 26c the desired verification data including identification of the product verified at the price verifier 20. In this way, over the course of time, the purchase database 26b accumulates a record of actual sale of various products from the store, and concurrently, the verification database 26c additionally stores a record of which specific products 12 were presented to the various price verifiers 20 for price confirmation.

As shown in FIG. 3, the method may then include suitably comparing the verification and purchase data collected in the respective databases 26c,b for use in inventory management, for example. The comparison of data may be effected using suitable means such as software loaded into a digital computer 24b which may be the server 24 itself, or may be an independent computer. The databases 26b,c may be maintained locally with the common server 24, or may be remote, or may be downloaded to suitable devices such as memory tapes or diskettes for subsequent analysis and comparison in the computer 24b.

Since the purchase database 26b may include product identification, and date and time of purchase at an identified POS terminal 18, a desired verification data record also includes identification of the product presented to the price verifiers 20, and the date and time of verification for each product. The common server 24 may therefore be configured with suitable software to store this data in the respective purchase and verification databases 26*b,c*.

Since the system 10 illustrated in FIGS. 1 and 2 includes a plurality of the POS terminals 18 spaced apart from each other near the store entrance, as well as a plurality of the price verifiers 20 spaced remotely from the terminals 18 and distributed conveniently throughout the store 14, it is also desirable to identify the specific location of each of these terminals 18 and verifiers 20. Each of the terminals 18 includes a unique identification which is transmitted to the server 24 and stored in the purchase database 26*b* in a conventional manner, and each of the price verifiers 20 is similarly configured to additionally include a unique serial or identification number therein which is also transmitted to the server 24 for storage in the verification database 26*c* along with the record for each product presented for price verification.

The purchase and verification databases 26*b,c* therefore preferably include the identification of the several POS terminals 18 and price verifiers 20. Since each terminal and verifier has a unique identification number, and is specifically located in the store 14, the respective purchase and verification databases can record not only the location of where the product was purchased in the store 14, but also the location of the specific verifier at which price confirmation was obtained.

The comparing means 24*b* may then be used for comparing any desired record of the verification and purchase data stored in the respective databases therefor.

For example, FIG. 3 illustrates an exemplary comparison of the verification and purchase databases. The comparing means 24*b* may be configured for tabulating quantity of verifications and purchases for a common identified product for a corresponding time period. Each of the products or items is identified and listed in a comparison record or database 26*d* suitably stored locally with the server 24 or remotely therefrom as desired.

Associated with each product is a tabulation of the number of verifications therefor at each of the several price verifiers 20 found in a specific store 14, as well as a tabulation of the actual purchase of the corresponding item at each of the several POS terminals 18 within a preselected time period which may include hours, days, fiscal weeks (FW), months, or other desired time periods. Since each purchase and verification record identifies the specific terminal or verifier, product, and data and time of purchase or verification, this data may be analyzed for improving product inventory, marketing, and management as desired, using a system not otherwise available but for the present invention.

For example, the verification database may show a large interest in a specific product by the large number of times the product is presented for price verification, yet the number of purchases of the same item may be relatively few. This may indicate a perceived excessive price for the item, which may subsequently be reduced in order to promote its sale and a reduction in inventory thereof.

Accordingly, the improved system 10 and method of collecting activity data for the products has significant utility in improving various aspects of product merchandising. The system allows the collection of interaction data as a customer presents products for price verification, which verification data may then be compared with actual purchase data obtained from the several POS terminals 18.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A system for collecting activity data for a plurality of products displayed in a merchandising store comprising:
   a transaction terminal for identifying selected ones of said products presented by a customer for purchase, and printing an itemized receipt therefor to confirm purchase thereof;
   a stationary price verifier located remotely in said store from said terminal and being independent therefrom for verifying price of selected ones of said products presented by a plurality of customers, and not configured for purchase transaction; and
   a server operatively joined with said terminal and verifier;
   a first database operatively joined to said server for storing corresponding prices for said products for retrieval by said server for display at said terminal and verifier;
   a second database operatively joined to said server for storing purchase data including identification of a product purchased at said terminal; and
   a third database operatively joined to said server for storing verification data including identification data of a product verified at said verifier whether or not selected for purchase by said customer, and retaining said verification data after completion of said purchase transaction.

2. A system according to claim 1 further comprising means for comparing said verification and purchase data.

3. A system according to claim 2 wherein said server is configured to store date of purchase and verification of said products in said second and third databases, respectively.

4. A system according to claim 3 wherein said server is configured to store time of purchase and verification of said product in said second and third databases, respectively.

5. A system according to claim 4 wherein said comparing means are configured for tabulating quantity of verifications and purchases for a common product for a corresponding time period.

6. A system according to claim 2 wherein:
   said terminal and verifier have respective location identifications; and
   said server is configured to store said location identifications in said second and third databases, respectively.

7. A system according to claim 6 further comprising:
   a plurality of said transaction terminals; and
   a plurality of said price verifiers spaced remotely from said terminals, and operatively joined to said server for collectively storing in said third database said verification data therefrom.

8. A system according to claim 7 wherein:
   each of said transaction terminals includes a barcode scanner, cash register, and receipt printer operatively joined together for scanning a product and determining price therefor, printing a receipt therefor, and obtaining payment to complete sale thereof; and
   each of said price verifiers includes a barcode scanner and monitor operatively joined together for scanning a product and determining price therefor, and displaying said price on said monitor.

9. A method for collecting activity data for a plurality of products displayed in a merchandising store having a purchase transaction terminal and a stationary non-purchase-transaction remote price verifier, said method comprising:

operating said terminal for identifying one of said products presented for purchase and printing an itemized receipt therefor to confirm purchase thereof;

storing purchase data including identification of said product purchased at said terminal;

operating said verifier by a plurality of customers for verifying price of said products presented thereto; and storing verification data including identification of said products verified at said verifier whether or not selected for purchase by said customers, and retaining said verification data after completion of said purchase transaction.

10. A method according to claim 9 further comprising comparing said verification and purchase data.

11. A method according to claim 10 wherein:

said purchase data further includes date of purchase; and said verification data further includes date of verification.

12. A method according to claim 11 wherein said purchase and verification data further include time of purchase and verification, respectively.

13. A method according to claim 12 wherein said comparing step includes tabulating quantity of verifications and purchases for a common product for a corresponding time period.

14. A method according to claim 10 wherein said purchase and verification data further include location of said terminal and verifier, respectively.

* * * * *